3,745,169
Patented July 10, 1973

3,745,169
HYDROLYZING FLUORODIAZADIENES TO FORM N,N'-FLUOROALIPHATIC-SUBSTITUTED UREAS
Paul H. Ogden, Woodbury Village, Minn., assignor to Minnesota Mining and Manufacturing Company, St. Paul, Minn.
No Drawing. Continuation-in-part of application Ser. No. 627,609, Apr. 13, 1967. This application June 29, 1970, Ser. No. 51,017
Int. Cl. C07d 49/30; C08g 22/02
U.S. Cl. 260—309.7                    9 Claims

ABSTRACT OF THE DISCLOSURE

This invention relates to a novel process for hydrolyzing fluorodiazadienes, such as

or $CF_2=N(CFXCFY)_nN=CF_2$, where X and Y are each fluorine or a lower perfluoroalkyl group, and $n$ represents an integer between 1 and about 20, inclusive, and to the novel N,N'-fluoroaliphatic-substituted ureas of the formula

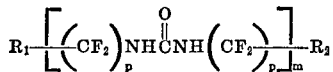

where $R_1$ and $R_2$ are fluoroaliphatic radicals, such as trifluoromethyl, —$CF_3$, or $R_1$ and $R_2$ together can form part of a fluoroalicyclic (preferably perfluoroalicyclic) ring made up of carbon and nitrogen atoms, preferably a imidazolidone ring, or $R_1$ and $R_2$ are terminal groups which are residues of a hydrolyzed azomethine group, $p$ is zero and $m$ is 1 when $R_1$ and $R_2$ are said fluoroaliphatic radicals or together form said fluoroalicyclic ring, or $p$ is an integer, preferably 2 to 10, inclusive, and $m$ is an integer of 5 to 100 inclusive, when $R_1$ and $R_2$ are said residues of hydrolyzed azomethine.

CROSS-REFERENCE

This application is a continuation-in-part application of copending application Ser. No. 627,609, filed Apr. 13, 1967, now U.S. Pat. No. 3,538,157, the disclosure of which is incorporated herein by reference.

BACKGROUND

In spite of continuously increasing technical interest in highly fluorinated organic materials there are very few references in the available technical literature to perfluoro (N-substituted alkylamines) which contain a hydrogen atom bound to the nitrogen atom. Only a few such materials have been described, namely N,N-bis-(trifluoromethyl) amine, $CF_3$—NH—$CF_3$, [Barr and Hazeldine, J. Chem. Soc., 2532 (1955); Young, Tsoukalis, and Dresdner, J. Amer. Chem. Soc., 80 3604 (1958)] and 1 H-decafluoropiperidine,

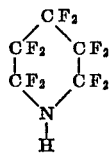

[Banks, Cheng, and Haszeldine, J. Chem. Soc., 2458 (1964)]; and compounds disclosed by Pearlson and Hals in U.S. Pat. No. 2,643,267. All of these compounds decompose in the presence of water.

Although N-perfluoroalkyl-substituted ureas and urethanes have been reported [Dannley and Yamashire, J. Org. Chem., 27,599 (1962) and references therein], these compounds are not completely fluorinated and contain a hydrocarbon moiety. They are prepared by the condensation of a fluoroalkyl isocyanate and either an alcohol or an amine. For instance, N-(perfluoro-n-propyl)-N'-phenyl-urea, $C_3F_7NHCONHC_6H_5$, is prepared from perfluoro-n-propylisocyanate $C_3F_7$-NCO and aniline $C_6H_5NH_2$. These compounds are unstable. They decompose spontaneously at room temperature and react vigorously in the presence of water.

In those cases which have been reported, the result of hydrolysis of a terminal azomethine containing the

—N=$CF_2$ moiety involves initial conversion of the perfluoroazomethine group (—N=$CF_2$) to an isocyanate group (—N=C=O), with a subsequent hydrolysis to a nitrile, a carboxylic acid amide, or the ammonium salt of a carboxylic acid. Similarly, perfluoroazaalkenes in which the CF=N bond is not terminal have been reported to yield perfluorocarboxylic acids upon hydrolysis. As far as is known, no one has heretofore isolated or identified perfluoro(alkylamides).

SUMMARY

It has now been discovered that certain perfluorodiazadienes can be controllably hydrolyzed to produce a new class of compounds, namely N,N'-fluoroaliphatic-substituted ureas, which are represented by the general formula

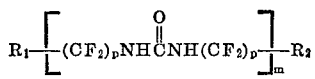

where $R_1$ and $R_2$ are fluoroaliphatic radicals, such as trifluoromethyl, —$CF_3$, or $R_1$ and $R_2$ together can form part of a fluoroalicyclic (preferably perfluoroalicyclic) ring made up of carbon and nitrogen atoms, preferably imidazolidone ring, or $R_1$ and $R_2$ are terminal groups which are residues of a hydrolyzed azomethine group, $p$ is zero and $m$ is 1 when $R_1$ and $R_2$ are said fluoroaliphatic radicals or together form said fluoroalicyclic ring, or $p$ is an integer, preferably 2 to 10, inclusive, and $m$ is an integer of 5 to 100, inclusive, when $R_1$ and $R_2$ are said residues of hydrolyzed azomethine.

The above general formula covers three subclasses of compounds, which are represented by the formulas (1)  $R_fNHCONHR_f$ (2)  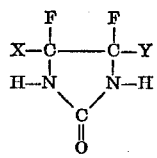

(3)  $$A\text{---}[(CF_2)_{\frac{n}{2}}NHCONH(CF_2)_{\frac{n}{2}}]_m\text{---}A$$

where $R_f$ is a fluoroaliphatic radical, such as trifluoromethyl, —$CF_3$, X and Y are fluorine or lower prefluoroalkyl radicals, e.g., —$CF_3$, A is a residue from the hydrolysis of a terminal azomethine group, $n$ is an integer of 4 to 20, inclusive, and $m$ is an integer of 5 to 100, inclusive.

The fluoroaliphatic radical, $R_f$, is a fluorinated aliphatic radical containing at least one carbon atom in the skeletal chain. The chain may be straight, branched, or cyclic, and may be interrupted by divalent oxygen atoms or divalent sulphur atoms. Preferably, such skeletal chain does not contain more than one oxygen or sulphur atom for every two carbon atoms in the skeletal chain. It is preferred to have only fluorine present as substituents to satisfy non-skeletal valences. Preferably, such fluoroaliphatic radical contains less than about 20 carbon atoms in its skeletal chain. More preferably, $R_f$ is a lower perfluoroalkyl radical containing less than 7 carbon atoms (i.e. from 1 to 6).

The fluoroidazadienes used as starting materials to prepare the novel N,N'-substituted ureas of this invention each contain two occurrences of the moiety

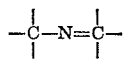

the dangling valences of each such moiety each being satisfied by a member of the group consisting of fluorine, chlorine, perfluoroalkyl, perfluoroalkylene, perfluorochloroalkylene, and percuoroazaalkylene. Preferably, such starting perfluorodiazadienes contain less than thirty carbon atoms each. Preferred classes of perfluorodiazadiene starting materials are characterized by the following generic formulas:

(4) $CF_2=N+(CF_2)_nN=CF_2$ (5) $CF_2=N+(CFXCFY)_nN=CF_2$ where X and Y are each fluorine or a lower perfluoro alkyl group, 20 and $n$ represents an integer between 1 and about 20, inclusive.

The compounds of Formulas 4 and 5 may be prepared by the ultraviolet photolysis of perfluoro-2,3-diazabuta-1,3-diene and either a fluorinated olefin or a source of perfluorinated carbene, such as difluorocarbene (copending U.S. patent application Ser. No. 562,540, now U.S. Pat. 3,584,048.

The controlled hydrolysis of the starting compounds of Formulas 4 and 5, in accordance with the present invention, is carried out by maintaining such compounds in contact with stoichiometric or excess amounts of water for a length of time which is sufficient to convert substantially all of the azomethine groups thereof into perfluoro (alkylamide) groups as illustrated by the following Equations I and II:

(I)

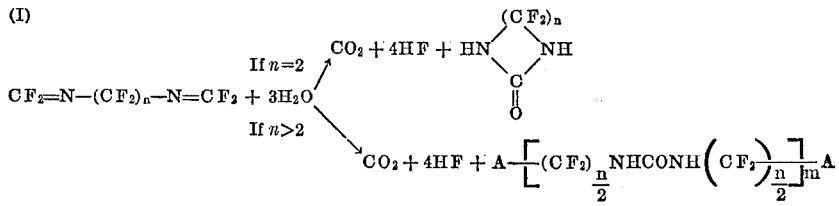

where X is as defined above, $n$ is as defined above, $m$ represents an integer from about 5 through 100, and A is a terminal group which is a hydrolysis residue from the terminal azomethine groups, for example, A is a carboxyl or amide. In some instances, such as when X and Y are fluoride, compounds of the formula $CF_3N=CF(CF_2)_{n-2}CF=NCF_3$ may be formed in situ during hydrolysis of the compounds of Formulas 4 and 5, thence producing perfluoro (alkylamides), as illustrated by Equation II where $n$ is more than two:

(II)

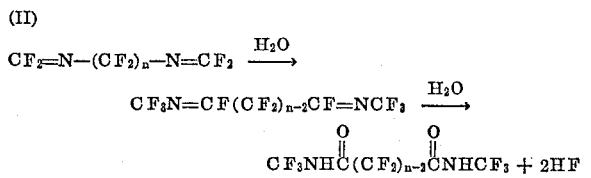

Although such hydrolyses can be carried out in basic environment, that is, an environment wherein the pH is greater than 7 (i.e. which is not strongly basic), the yield of N,N'-fluoroaliphatic product is reduced in such instances, presumably due to decomposition, as, for example, by further hydrolysis of products. Therefore, a pH of about 7 or below is preferred in practicing the hydrolysis teachings of this invention. While the hydrolysis reaction can be carried out with the diazadiene starting material present primarily in the gas phase, it is preferred to use the liquid phase, and it is more preferred to use an organic mutual solvent in which both water and starting diazodiene are soluble. Such mutual solvent should be inert towards the diazadiene, i.e., it should be free of reactive groups such as active hydrogen, and free of hydrolyzable groups such as esters, acyl halides, and the like. Suitable solvents include ketones, such as acetone or methyl ethyl ketone. Since the products of this invention are characteristically stable to acid or neutral hydrolysis, excess water may be used.

While preferred temperatures range from about 5 to 100° C., it will be appreciated that the exact reaction temperature used in any given situation is not critical. Thus, for example, lower temperatures may be used with longer reaction times.

The hydrolysis reaction can be conveniently monitored by examining the infrared spectra of the volatile materials since the N,N'-fluoroaliphatic-substituted urea products of this invention are solids of low vapor pressure at room temperature. Solvents and starting materials, which are volatile, may be removed by evaporation. The desired products may be separated by crystallization or sublimation.

Depending upon selection of starting material, one obtains different products which are either cyclic or acyclic.

When the compound of Formula 4 in which $n=1$ is hydrolyzed in accordance with the invention, there is produced a compound of the formula:

(6)    $CF_3NHCONHCF_3$

The compound of Formula 6 is N,N'-bis(trifluoromethyl)urea which also can be termed perfluoro(N,N'-dimethylurea). This compound is a white solid which sublimes at 100° C. under atmospheric pressure, and is soluble in common organic solvents such as acetone and ethanol.

The compound of Formula 6 is useful as a nuclear magnetic resonance spectral reference compound because it produces a well-defined $F^{19}$ doublet in polar solvents such as acetone. This compound also displays herbical activity, especially against green foxtail grass.

When compounds of Formula 4 in which $n$ is greater than three are hydrolyzed by water under acid or neutral conditions there are produced N,N'-perfluoroalkylene-substituted ureas which are polymeric and can be characterizable by the following formula:

(7)

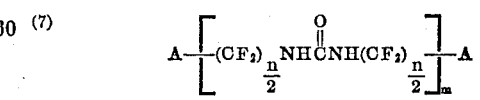

wherein $n$ is an integer between about 4 and 20, $m$ is an integer between about 5 and 100, and A is a residue from the hydrolysis of a terminal azomethine group, e.g., carboxyl, amide, nitrile, or isocyanato.

Compounds of Formula 7 may be termed poly(N,N'-perfluoroalkyleneureas). Such compounds are generally white, insoluble, high melting solids. They are generally moldable, castable, thermoplastic solids which may be formed into desired predetermined shapes, such as bearings or seals for use in pumps.

When a compound of Formula 5 is hydrolyzed in accordance with this invention, there is produced a compound characterized by the generic formula:

(8) 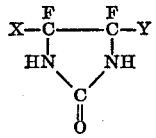

wherein X and Y are each as defined above.

These compounds of Formula 8 are N,N'-perfluoroalkylene-substituted ureas which can be termed 4,5-perfluoro-substituted-2-imidazolidones. Preferred compounds of Formula 8 are those where X is fluorine and Y is a lower perfluoroalkyl radical. Formula 8 compounds are characteristically white solids soluble in common organic solvents, such as acetone and slightly soluble in water. These compounds are characteristically thermally and hydrolytically stable under ambient conditions. They are characteristically recovered unchanged after sublimation.

The compounds of Formula 8 are useful as cloth-treating agents since when deposited on cloth they impart water-repelling properties to cloth fibers containing reactive hydrogen atoms, such as, cellulose (cotton) fibers or protein (wool) fibers.

The invention is illustrated in greater detail by the following examples. In all cases, the products described are purified either by crystallization from acetone or by sublimation or by both.

Example 1

Perfluoro-2,4-diazapenta-1,4-diene, $$CF_2=N-CF_2-N=CF_2,$$

(0.5 g.) is condensed under vacuum at $-196°$ C. into a Pyrex glass bulb which contains 5 cc. of water. After warming to room temperature, the bulb and its contents are allowed to stand for 24 hours. The white solid which deposits is then filtered off, washed with a small quantity of water, and after purification is identified by its elemental analysis as perfluoro(N,N'-dimethylurea), $$CF_3NHCONHCF_3$$

The yield is approximately 0.2 g. ($\sim$40%).

Analysis.—Calcd. for $C_3H_2F_6N_2O$ (percent): C, 18.4; H, 1.0; N, 14.8. Found (percent): C, 19.0; H, 1.2; N, 14.3.

The structure of the product is confirmed by its $F^{19}$ n.m.r. spectrum which contains a doublet (J=3.3 cps.) at 56.2 $\phi$* [see G. Filipovich and G. V. D. Tiers, J. Phys. Chem., 63, 761 (1959)] and its infrared spectrum which shows absorptions at 3.01$\mu$ and 6.2$\mu$ corresponding to the NH bonds and 5.89$\mu$ corresponding to the carbonyl bond.

Example 2

The process of Example 1 is repeated using perfluoro-2,5-diazahexal-1,5-diene, $CF_2=N-CF_2-CF_2-N=CF_2$. Perfluoro(N,N'-dimethyloxamide) (approximately 20% of theoretical) is obtained together with a small quantity of a solid which is appreciably more soluble in water. This solid is identified by its $F^{19}$ n.m.r. and infrared spectrum as perfluoro-2-imidazolidone,

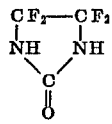

Its $F^{19}$ n.m.r. spectrum shows a signal at 94 $\phi$* corresponding to —$CF_2$— and its infrared spectrum shows absorptions at 3.1$\mu$ and 5.7$\mu$ corresponding to the NH bonds and carbonyl bond, respectively.

Example 3

The process of Example 1 is repeated using perfluoro-(3-methyl-2,5-diazahexa-1,5-diene), $$CF_2=N-CF_2-CF(CF_3)-N=CF_2$$

After purification, the white solid product is identified by its elemental analysis as perfluoro(4-methyl-2-imidazolidone),

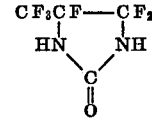

The yield is about 40% theory.

Analysis.—Calcd. for $C_4H_2F_6N_2O$ (percent): C, 23.1; H, 1.0; N, 13.5. Found (percent): C, 23.1; H, 1.0; N, 12.8.

The structure of the product is confirmed by its $F^{19}$ n.m.r. spectrum which shows a complex doublet (J=13.9 cps.) at 79.3 $\phi$* corresponding to the $CF_3$ group, a complex peak at 134.8 $\phi$* corresponding to the —CF group, and an AB pattern (J=188 cps.) at 84.6 and 91.3 $\phi$* corresponding to the $CF_2$ group, and by its infrared spectrum which shows absorptions at 3.09$\mu$ and 3.1$\mu$ corresponding to the NH bonds and at 5.65$\mu$ corresponding to the carbonyl bond.

Example 4

Perfluoro-2,3-diazabuta-1,3-diene (1 part) and tetrafluoroethylene (10 parts) are photolyzed together for 5 hours in a silica tube using a BH-6 lamp, at room temperature. A white solid is produced which is shown by its infrared spectrum to have the characteristic structure $$CF_2=N-(CF_2)_n-N=CF_2$$

where the value of n is about 20. This material is then hydrolyzed with water to produce a white, insoluble high-melting solid which is identified as a polyperfluorourea by its infrared spectrum. The terminal groups of this polymer are advantageous hydrolysis products of terminal azomethine groups of terminal methylimino groups. After prolonged heating with 40% alcoholic sodium hydroxide solution, this material is converted into the sodium salt of a high-molecular weight fluorinated carboxylic acid which is identified as such by its characteristic infrared spectrum.

I claim:

1. A process comprising contacting and hydrolyzing a perfluorobisazomethine with water having a pH not substantially above 7, and recovering the resulting N,N'-substituted urea, said perfluorobisazomethine having the formula $$CF_2=N(CF_2)_nN=CF_2$$

(I)

or $$CF_2=N(CFXCFY)_nN=CF_2$$

(II)

where X and Y are each fluorine or lower perfluoroalkyl and n is an integer of 1 to 20.

2. The process of claim 1, wherein said perfluorobisazomethine has said Formula I and n is 1 or 2.

3. The process of claim 1, wherein said perfluorobisazomethine has said Formula I and n is greater than 3.

4. The process of claim 1 wherein said perfluorobisazomethine has said Formula II, X is fluorine, Y is —$CF_3$, and n is 1.

5. A compound having the formula $CF_3NHCONHCF_3$.

6. Compounds of the formula

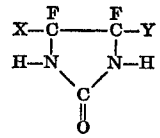

where X and Y are fluorine or lower perfluoroalkyl.

7. A compound of claim 6 wherein X is fluorine and Y is trifluoromethyl.

8. Compounds of the formula

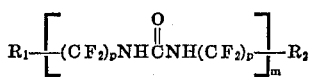

wherein $R_1$ and $R_2$ are either fluoroaliphatic radicals or together form a fluoroalicyclic ring when $p$ is zero and $m$ is 1, or wherein $R_1$ and $R_2$ are carboxyl, amide, isocyanate, or nitrile groups when $p$ is an integer of 2 to 10 and $m$ is an integer of 5 to 100.

9. Perfluoropolyureas of the formula

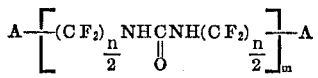

where A is carboxyl, amide, isocyanato, or nitrile group, $n$ is an integer of 4 to 20, and $m$ is an integer of 5 to 100.

References Cited
UNITED STATES PATENTS

| 2,656,384 | 10/1953 | Lindgren et al. | 260—553 R |
| 3,433,800 | 3/1969 | Parker | 260—309.7 |

DONALD E. CZAJA, Primary Examiner

M. J. WELSH, Assistant Examiner

U.S. Cl. X.R.

71—119; 117—135.5; 260—77.5 C, 553 R, 566 R

UNITED STATES PATENT OFFICE
CERTIFICATE OF CORRECTION

Patent No. 3,745,169                    Dated July 10, 1973

Inventor(s) PAUL H. OGDEN

It is certified that error appears in the above-identified patent and that said Letters Patent are hereby corrected as shown below:

Column 3, Line 3, "fluoroidazadienes" should read fluorodiazadienes

Column 3, Line 12, "percuroroazaalkylene" should read perfluoroazaalkylene

Column 3, Line 21, "20" should be deleted

Column 5, Line 55 "diazahexal" should read diazahexa

Column 6, Line 35, "advantageous" should read advantitious

Signed and sealed this 27th day of November 1973.

(SEAL)
Attest:

EDWARD M. FLETCHER, JR.            RENE D. TEGTMEYER
Attesting Officer                  Acting Commissioner of Patents